(12) United States Patent
Stewart et al.

(10) Patent No.: US 6,257,229 B1
(45) Date of Patent: Jul. 10, 2001

(54) COLLAPSIBLE CART FOR A BARBECUE GRILL

(75) Inventors: Daniel M. Stewart; Michael R. Giebel, both of Joplin, MO (US); Richard Whitehall, New York, NY (US); Donald R. Lamond, Joplin, MO (US); Dylan Akinrele, Brooklyn, NY (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 09/527,658

(22) Filed: Mar. 17, 2000

(51) Int. Cl.[7] .................................................. F24C 1/16

(52) U.S. Cl. .................... 126/276; 126/305; 126/41 R; 248/129; 248/439

(58) Field of Search ................................ 126/41 R, 25 R, 126/276, 304 R, 304 A, 9 R; 108/127; 248/439, 188.6, 148, 168, 169, 129; 280/401

(56) References Cited

U.S. PATENT DOCUMENTS

| | | | |
|---|---|---|---|
| 2,559,710 | * 7/1951 | Danielsen | 126/304 A |
| 4,131,261 | * 12/1978 | Shy | 126/304 A |
| 4,238,100 | * 12/1980 | Shy | 126/304 A |
| 4,949,701 | 8/1990 | Krosp et al. . | |
| 5,241,948 | * 9/1993 | Thibodeau | 126/304 A |
| 5,572,983 | * 11/1996 | Schlosser | 126/25 R |
| 5,947,007 | * 9/1999 | O'Grady et al. | 126/25 R |

* cited by examiner

*Primary Examiner*—James C. Yeung
(74) *Attorney, Agent, or Firm*—Kramer, Levin, Naftalis & Frankel LLP

(57) ABSTRACT

A foldable or collapsible cart for a barbecue grill and cart assembly which includes a frame assembly and first and second folding or collapsible leg assemblies. The leg assemblies are pivotally connected to the frame assembly at opposite ends thereof. The frame assembly mounts a barbecue grill casting. The frame assembly, barbecue casting and first and second folding leg assemblies are preferably preassembled by the manufacturer prior to shipping the barbecue grill and cart assembly. In this manner, less assembly is required on the part of the end user.

15 Claims, 5 Drawing Sheets

COLLAPSIBLE CART FOR A BARBECUE GRILL

FIELD OF THE INVENTION

The present invention is generally directed to a barbecue grill and cart assembly and, more specifically, to a collapsible cart for a barbecue grill that may be partly assembled for ease of shipping, packing, assembly and disassembly.

BACKGROUND OF THE INVENTION

Barbecue grills come in many sizes and configurations, ranging from the very small and portable hibachi type grills to the more elaborate gas type grills. As a general rule, the more elaborate the grill, the more assembly that is typically required by the ultimate consumer of these products. Because larger grills contain more components, including a cart, side burners, side trays and other miscellaneous parts requiring assembly, it has been found that it is more cost effective to ship the barbecue grill and its components in a disassembled state.

Often the degree of assembly required is a disincentive to purchasing one of the more elaborate grills. Ideally, at least in the mind of the consumer, grills would be packaged and shipped in a partly assembled state to minimize the amount of assembly. Thus the consumer could be spared the trouble and sometimes aggravation associated with the assembly of a barbecue grill.

However, from the perspective of the manufacturer, the packaging and shipment of a fully assembled, or even partly assembled, barbecue grill presents a number of problems including a significant increase in the dimensions of the shipping container and consequently the shipping costs. Additionally, a fully or partly assembled grill is more susceptible to damage during shipment than a grill which is disassembled and has its components packed individually. Consequently, in order to package and ship an assembled grill special consideration would have to be given to protecting the assembled grill from damage during shipment which would further increase the costs.

One solution known in the prior art is to provide a barbecue grill having a stand with foldable legs. However, such prior art designs use a conventional scissors-leg designs which can result in excess length, even in the folded or collapsed position. Thus even collapsed these grills tend to have a longer profile. Additionally, these prior art designs fail to consider the damage which may result from shipping a partly assembled barbecue grill.

OBJECTS AND SUMMARY OF THE INVENTION

Accordingly, it is an object of the present invention to provide a barbecue grill and cart assembly that overcomes the aforementioned deficiencies in the prior art.

It is another object to provide a barbecue grill and cart assembly that requires little or no assembly by the end user.

It is still another object of the present invention to provide a barbecue grill and cart assembly having a collapsible cart which is partly assembled prior to shipping thereby minimizing the amount of assembly required by the end user.

It is yet another object of the present invention to provide a barbecue grill and collapsible cart assembly which permits a more compact design for shipping, packing and storage.

In accordance with an aspect of the present invention, a collapsible or foldable cart for supporting a barbecue grill assembly comprises a generally u-shaped support assembly comprising a frame assembly for mounting thereto at least one of a barbecue grill casting, grill controls, a side burner and a side table. The collapsible cart further comprises a first leg assembly pivotally mounted to a first end of the frame assembly and a second leg assembly pivotally mounted to a second end of the frame assembly for pivoting the first and second leg assemblies between fully open and fully closed positions such that the second leg assembly extends adjacent a bottom side of the frame assembly in the fully closed position and the first leg assembly extends adjacent the closed second leg assembly in the fully closed position thereby forming a compact design.

In accordance with a further aspect of the present invention, the bottom casting of the barbecue grill casting is securely pre-mounted to the frame assembly prior to shipping the barbecue grill and cart assembly.

In accordance with still another aspect of the present invention, the first leg assembly includes skid resistant feet and the second leg assembly includes wheels or vice versa.

The above and other objects, features and advantages of the present invention will become readily apparent from the following detailed description thereof which is to be read in connection with the accompanying drawings.

DETAILED DESCRIPTION

Figure 1:
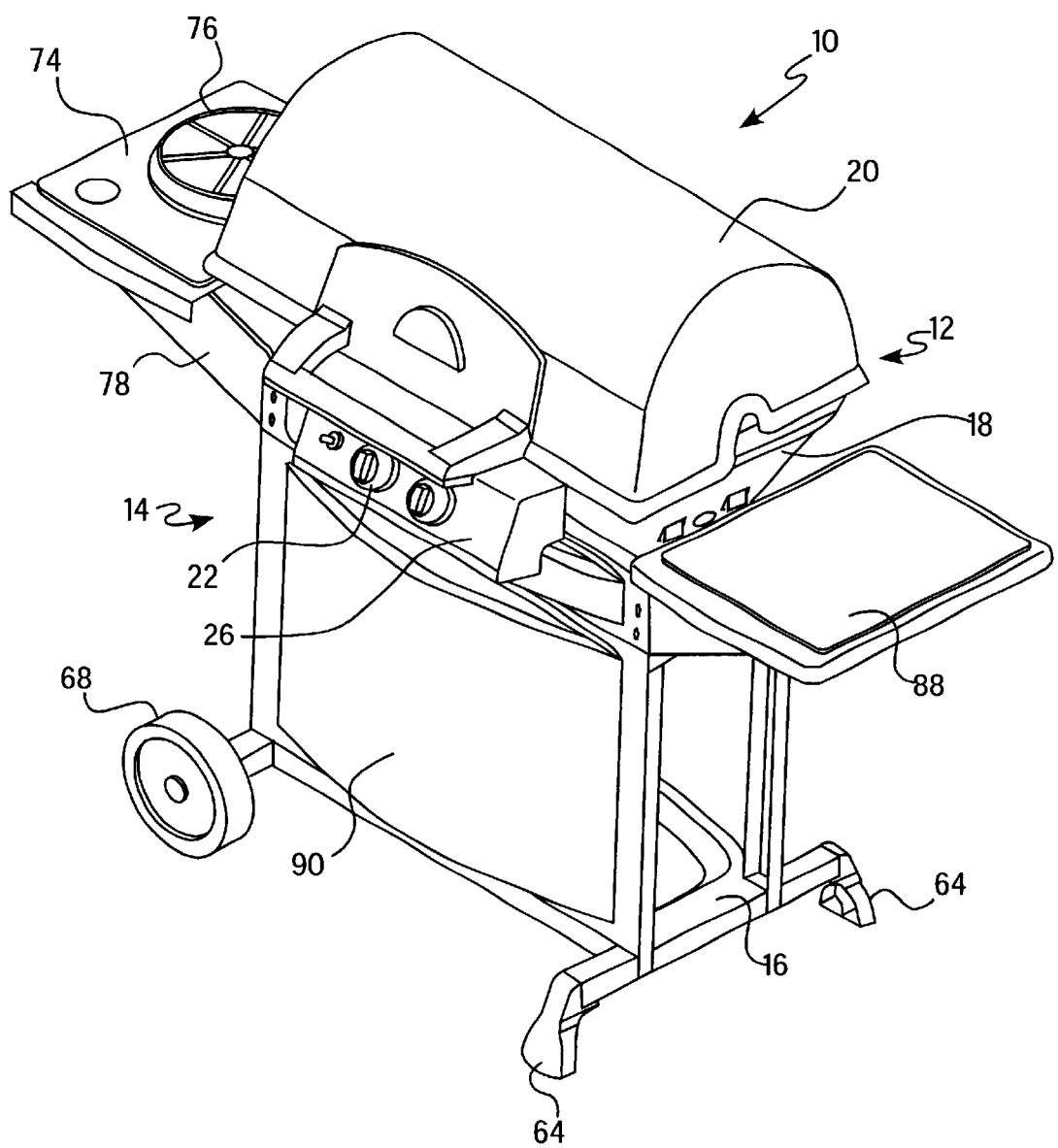
FIG. 1 is a front perspective view of a barbecue grill and cart assembly according to an exemplary embodiment of the present invention.
Figure 5:
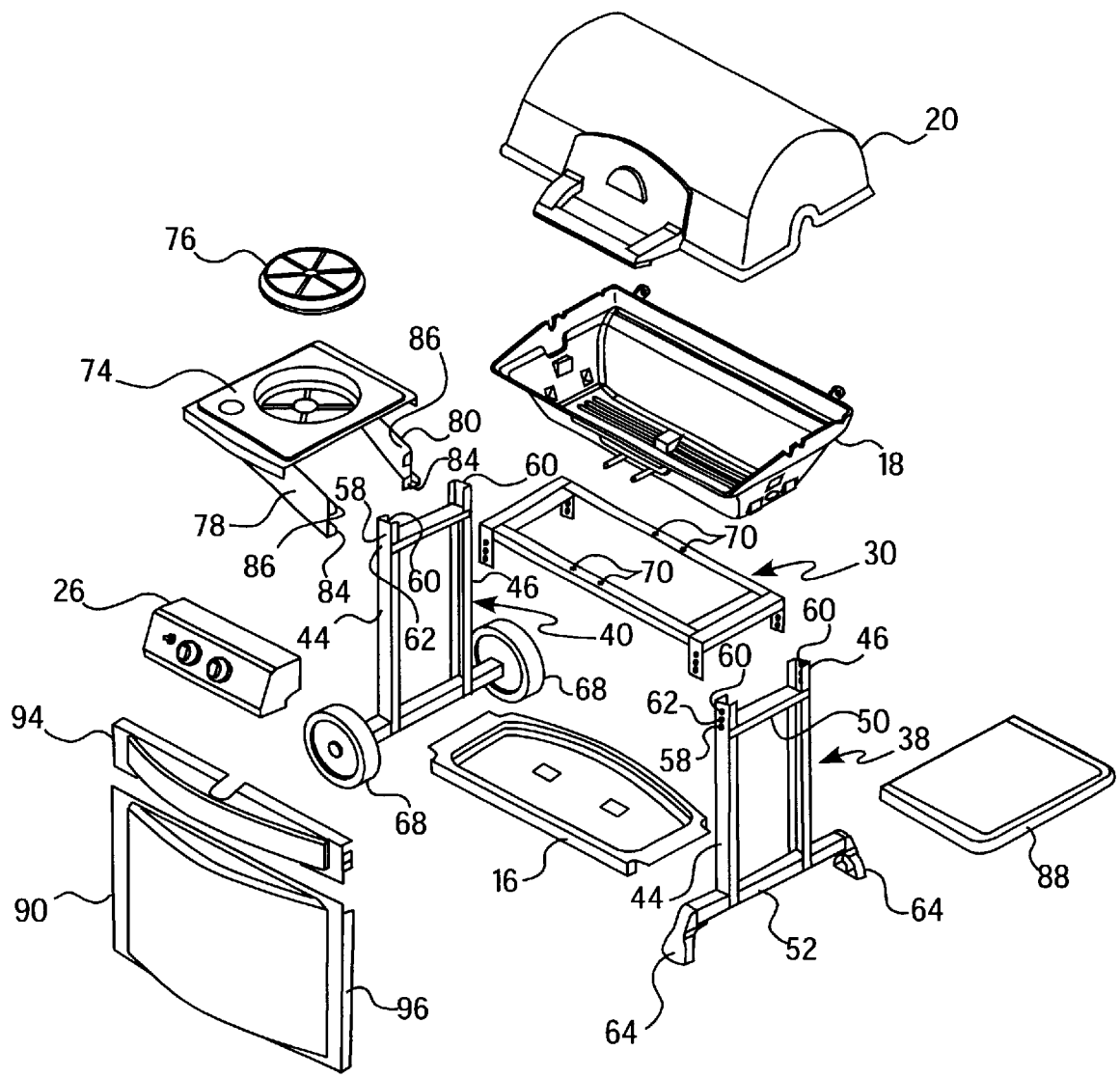
FIG. 5 is an exploded view of the barbecue grill and cart assembly according to an exemplary embodiment of the present invention.

Referring to FIGS. 1 and 5, a fully assembled barbecue grill and cart assembly in accordance with an exemplary embodiment of the present invention is generally shown as reference numeral 10. The barbecue grill and cart assembly 10 generally comprises a barbecue grill casting which is generally shown as reference numeral 12, a generally u-shaped collapsible cart generally shown as reference numeral 14 and a tray 16 for supporting a gas tank (not shown). The barbecue grill casting 12 is of a generally conventional structure and is made of, for example, cast aluminum. The barbecue grill casting 12 comprises a bottom casting or bowl 18 and a pivotally connected top casting or hood 20. The grill further includes barbecue grill controls 22 which are connected between the gas tank and barbecue grill burner 24, in a conventional manner, to control the flow of gas to the burner 24. As shown in FIGS. 1 and 5, the barbecue grill controls 22 are housed within a panel 26, which is mounted to the collapsible cart 14.

The collapsible or foldable cart 14 comprises a generally rectangular frame assembly 30 made of, for example, cold rolled steel. The rectangular frame assembly 30 comprises four mounting brackets 34, each bracket mounted adjacent one of the four corners of the rectangular frame assembly 30 (see FIG. 5). Specifically, a first pair of brackets 34 are oppositely mounted along a front face and rear face of a first end of frame assembly 30, and a second pair of brackets 34 are oppositely mounted along the front face and the rear face of a second end of frame assembly 30. The brackets 34 may be separately welded to the flame assembly 30 or fixed thereto by other conventional means. The collapsible cart 14 further comprises a first generally rectangular leg assembly 38 and a second generally rectangular leg assembly 40. The first and second assemblies 38, 40 are pivotally mounted between the first and second pairs of brackets 34, respectively, as best illustrated in FIG. 5.

More specifically, as shown in FIGS. 2–5, the first and second leg assemblies 38, 40 are each comprised of first and second c-shaped or channeled, parallel leg members 44, 46. The leg members 44, 46 are connected to each other by an upper transverse brace 50, adjacent an upper end and by a lower transverse brace 52, adjacent a lower end. Each of the leg members 44, 46 (of leg assemblies 38, 40) includes along an outside face of the leg members 44, 46, vertically spaced bottom and top holes or bores 58, 60. In between the two vertically spaced holes 58, 60, each leg member 44, 46 includes a detent or protrusion 62 for helping to align the leg assemblies 38, 40 in the upright position (as will be explained hereinafter).

The lower transverse brace 52 of first leg assembly 38 includes a pair of skid resistant feet or pedestals 64, 64 mounted to opposite ends of brace 52. The lower transverse brace 52 of the second leg assembly 40 includes a pair of wheels 68, 68 which are mounted by conventional means on opposite ends thereof for permitting the barbecue grill and cart assembly 10 to be easily moved from location to location. As should be apparent, the locations of the pedestals 64, 64 and wheels 68, 68 may be easily interchanged. In the exemplary embodiment of FIG. 5, the tray 16 extends between the lower transverse braces 52 of the first and second leg assemblies 38, 40. The tray 16 may be fixed to the braces 52 using screws, bolts or the like.

As shown in FIGS. 2–5, each of the four brackets 34 includes three holes or openings, which correspond to the vertically spaced bottom and top holes 58, 60 and detents or protrusions 62. In a partly assembled state, the first leg assembly 38 is pivotally connected to the frame assembly 30 along a pivot axis extending through the bottom holes 58 of the leg members 44, 46 and the corresponding bottom holes of the first pair of brackets 34. Similarly, the second leg assembly is pivotally mounted to the frame assembly 30 through a pivot axis extending through the top holes 60 of the leg members 44, 46 and the corresponding top holes of the second pair of brackets 34. The legs assemblies 38, 40 may be secured on the pivot axes by means of, for example, a headed rivet, pivot pin, bolt or the like.

When the barbecue grill and cart assembly 10 is shipped, preferably the leg assemblies 38, 40 are pivotally mounted to the frame member 30 by the manufacturer, as previously described. Additionally, the bottom casting 24 is also preferably mounted to the frame member 30, prior to shipping. As shown in FIG. 5, the frame assembly 30 includes a plurality of mounting holes 70 for mounting the bottom casting 18 to the frame assembly 30. Although not shown in the drawings, bottom casting 18 includes corresponding holes which align with the holes 70 in the frame assembly 30. The bottom casting 18 may be secured to the frame assembly 30 using bolts, screws or the like. Additionally, it is also preferable that the leg assemblies 38, 40 are pre-assembled (prior to shipping) with the pedestals 64, 64 and wheels 68, 68 to further minimize the assembly required by the end user.

Figure 2:
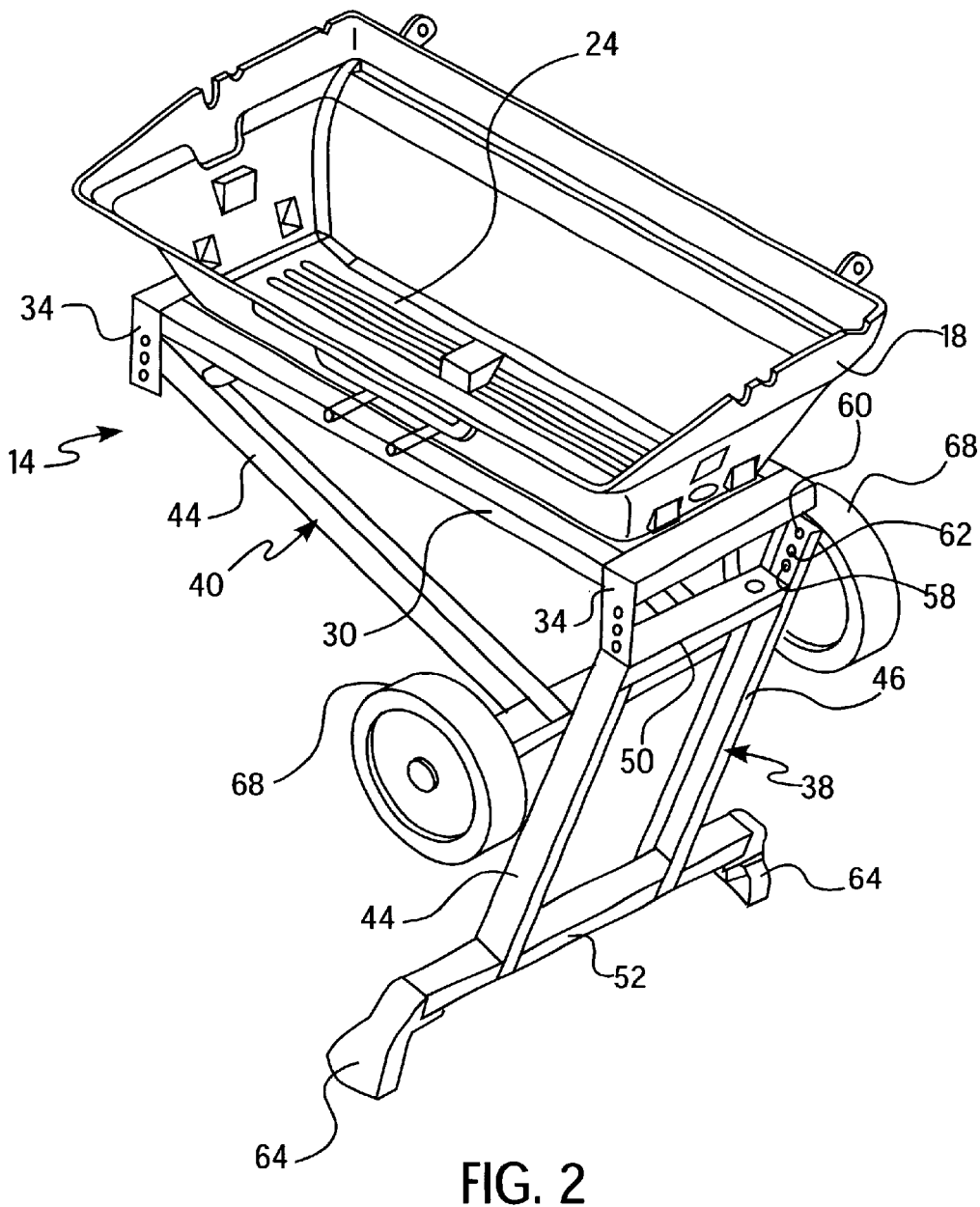
FIG. 2 is a perspective view of the barbecue grill and cart assembly in a partly assembled state with the cart in a fully collapsed position.
Figure 3:
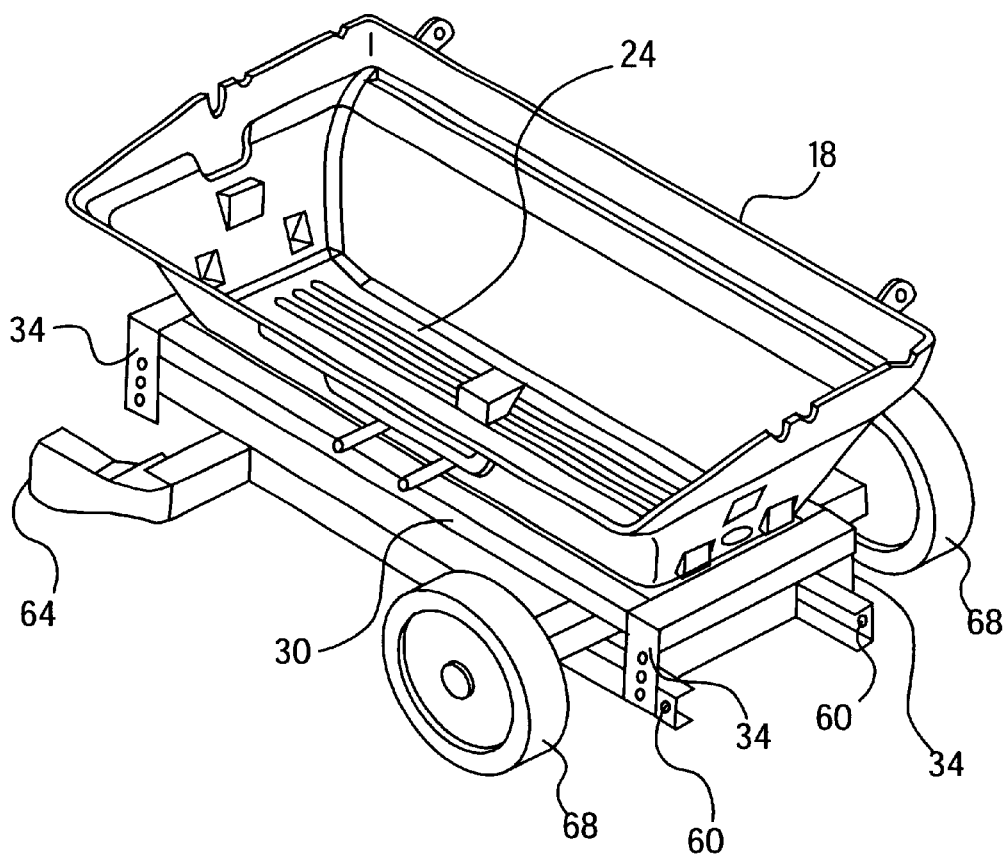
FIG. 3 is a perspective view of the barbecue grill and cart assembly in a partly assembled state with the leg assemblies partly extended.
Figure 4:
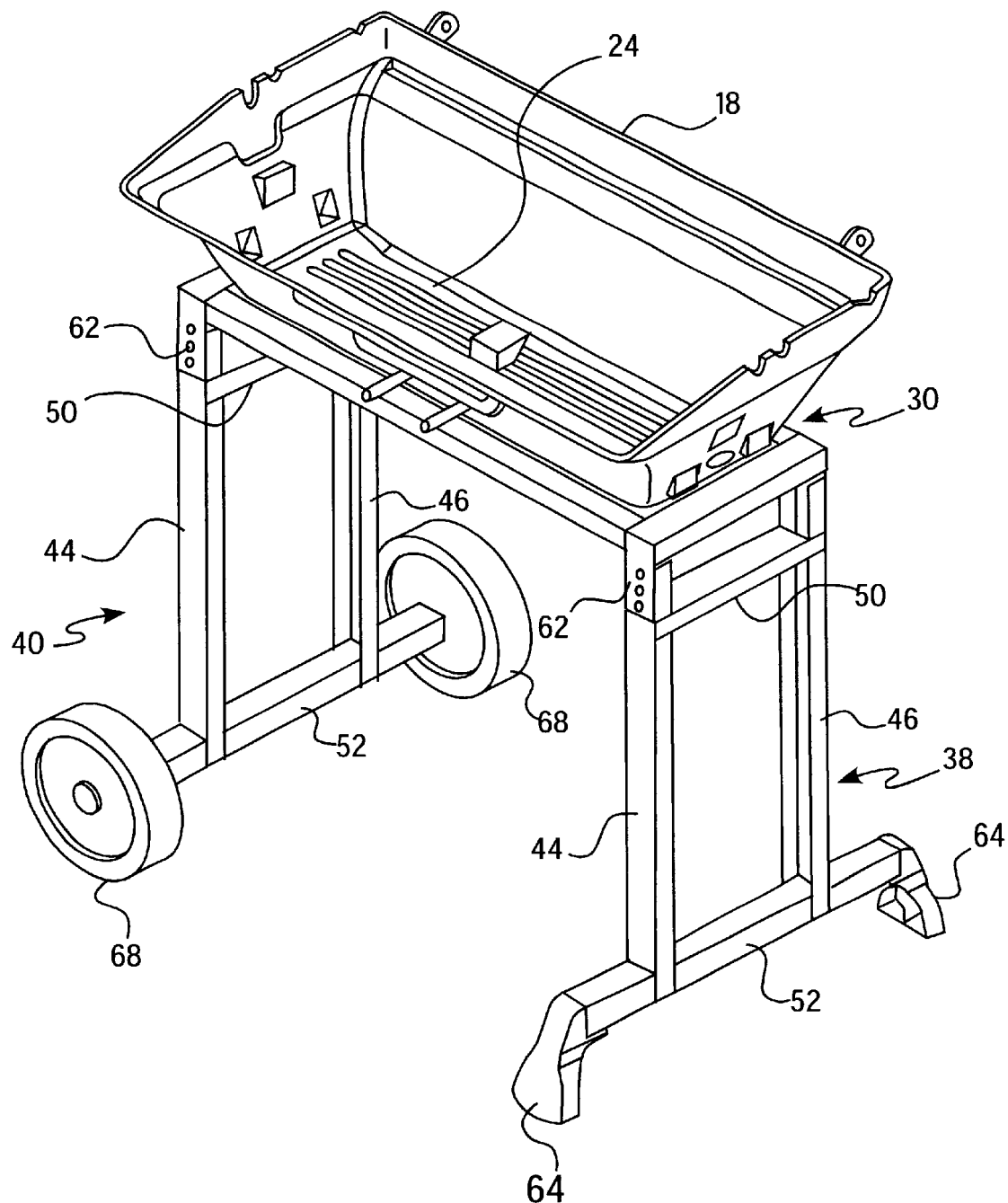
FIG. 4 is a perspective view of the barbecue grill and cart assembly in a partly assembled state with the leg assemblies fully extended.

Referring to FIGS. 2 through 4, a partly assembled barbecue grill and cart assembly is shown between a fully collapsed position and a fully extended or upright position. FIG. 2 shows a fully collapsed cart 18 having mounted thereto a bottom casting 18. As shown in FIG. 2, in the fully collapsed position, second leg assembly 40 is folded in such that it is adjacent to or abuts the underside of frame assembly 30, and the first leg assembly 38 is folded in such that it is adjacent to or abuts folded leg assembly 40. Since frame assembly 30 and leg assemblies 38, 40 are approximately the same dimension, the folded or collapsed structure shown in FIG. 2 is very compact. This compact design minimizes the overall dimensions of the structure and provides additional support and protection during shipment, thereby reducing shipping costs and the likelihood of damage during shipping.

As shown in FIG. 3, the structure shown in FIG. 2 is unfolded by first pivoting outwardly (away from the frame assembly 30) the first leg assembly 38 and thereafter pivoting outwardly (away from the frame assembly 30) the second leg assembly 40, until both leg assemblies 38, 40 are in the upright position (i.e., substantially 90 degrees with respect to the frame assembly 30). In the upright position, leg members 44, 46 are kept in place by detents or protrusions 62 which engage the middle holes or bores provided on brackets 34. Additional screws or bolts may be used to fix the leg assemblies 38, 40 in the upright position.

The barbecue grill and cart assembly 10 of the present invention may be equipped with additional components such as are shown in FIGS. 1 and 5. In particular, in accordance with an exemplary embodiment, the barbecue grill and cart assembly 10 may include an additional side burner 74 including trivet 76 which is preferably assembled by the end user. As shown in FIG. 5, the side burner 74 is mounted to the second leg assembly 40. The side burner 74 includes a pair of braces 78, 80 which each include a pair of mounting tabs 84, 86. Each of the mounting tabs 84, 86 includes a hole. The mounting tabs 84, 86 are vertically spaced to correspond to the vertical spacing provided between corresponding vertically spaced holes or bores (not shown) provided in the leg members 44, 46 of the second leg assembly 40. With the holes in the mounting tabs 84, 86 aligned with the corresponding holes in the leg members 44, 46, the side burner 74 is fixed to the leg members 44, 46 (of the second leg assembly 40) by conventional means, such as screws or bolts. In this connection, the holes in the leg members 44, 46 or in the mounting tabs 84, 86 may be threaded to receive the bolts or screws. As shown in FIGS. 1 and 5, the barbecue grill and cart assembly 10 may also include a side table 88 mounted to the leg members 44, 46 of the first leg assembly 38 in a similar manner.

Finally, the barbecue grill and cart assembly 10 may also include additional components which serve a dual function of contributing to the overall aesthetic appearance of the design and reinforcing the stability of the assembled barbecue grill and cart assembly 10. Specifically, the barbecue grill and cart assembly 10 may also include a front panel 90 and control panel 94 which provides a decorative support for the gas valve and line (not shown). Front panel 90 includes side flanges 96, 96 which include vertically spaced holes which align with similarly disposed holes on leg members 44 of first and second leg assemblies 38, 40, as shown in FIGS. 1 and 5. The control panel 94 includes side tabs 98, 98 having holes which correspond to holes provided on the frame 30. With the panels 90, 94 in place, the panels 90, 94 are secured using conventional means, such as screws, bolts or the like.

Having described exemplary embodiments of the present invention with reference to the accompanying drawings, it will be appreciated that the present invention is not limited to those precise embodiments, and that various changes and modifications can be effected therein by one of ordinary skill in the art without departing from the scope or spirit of the invention as defined by the appended claims.

What is claimed is:

1. A collapsible cart for supporting a barbecue grill assembly comprising:

a generally u-shaped support assembly comprising:
  a frame assembly having first and second ends for mounting thereto at least one of a barbecue grill casting, grill controls, a side burner and a side table;
  a first leg assembly having first and second leg members pivotally mounted to said frame assembly adjacent said first end of said frame assembly for pivoting said first leg assembly between a fully open and fully closed position;
  a second leg assembly having third and fourth leg members pivotally mounted to said frame assembly adjacent said second end of said frame assembly for pivoting said second leg assembly between a fully open and fully closed position, such that said second leg assembly extends adjacent a bottom side of said frame assembly in said fully closed position and said first leg assembly substantially overlaps said closed second leg assembly in the fully closed position thereby forming a compact design; and
  wheels mounted to at least one of said first leg assembly and said second leg assembly such that said collapsible cart may be transported in said fully closed position using said wheels.

2. The collapsible cart of claim 1 further comprising skid resistant feet mounted to at least one of said first leg assembly and said second leg assembly.

3. The collapsible cart of claim 2 wherein said wheels are mounted to said second leg assembly and said skid resistant feet are mounted to said first leg assembly and said skid resistant feet are adapted to be used as handles to assist in transporting said collapsible cart in said fully closed position.

4. The collapsible cart of claim 1 wherein said frame assembly is generally rectangular and said first end of said frame assembly further comprises a first pair of mounting brackets and said second end of said mounting assembly includes a second pair of mounting brackets for pivotally mounting said first and second leg assemblies, respectively, to said frame assembly.

5. The collapsible cart of claim 4 further comprising at least one of a rivet, a pivot pin and a bolt for pivotally mounting said first and second leg assemblies to said first and second pairs of mounting brackets.

6. A barbecue grill and cart assembly comprising:
  a barbecue grill casting having a top casting and a bottom casting;
  a collapsible cart assembly comprising:
    a frame assembly having a first and second ends for supporting and mounting thereto said bottom casting;
    a first leg assembly pivotally mounted to said frame assembly adjacent said first end of said frame assembly for pivoting said first leg assembly between a fully open and fully closed position;
    a second leg assembly pivotally mounted to said frame assembly adjacent said second end of said frame assembly for pivoting said second leg assembly between a fully open and fully closed position, such that said second leg assembly extends adjacent a bottom side of said frame assembly in said fully closed position and said first leg assembly substantially overlaps said closed second leg assembly in the fully closed position thereby forming a compact design;
    means for mounting said bottom casting to said frame assembly; and
    wheels mounted to at least one of said first leg assembly and said second leg assembly such that said collapsible cart may be transported in said fully closed position using said wheels.

7. The barbecue grill and cart assembly of claim 6 further comprising skid resistant feet mounted to at least one of said first leg assembly and said second leg assembly.

8. The barbecue grill and collapsible cart of claim 7 wherein said second leg assembly further comprises a cross member for mounting said wheels and said first leg assembly includes a cross member for mounting said skid resistant feet and said skid resistant feet are adapted to be used as handles to assist in transporting said collapsible cart assembly in said fully closed position.

9. The barbecue grill and cart assembly of claim 6 wherein said frame assembly is generally rectangular and said first end of said frame assembly further comprises a first pair of mounting brackets and said second end of said mounting assembly includes a second pair of mounting brackets for pivotally mounting said first and second leg assemblies, respectively, to said frame assembly.

10. The barbecue grill and cart assembly of claim 9 further comprising at least one of a rivet, pivot pin and a bolt for pivotally mounting said first and second leg assemblies to said first and second pairs of mounting brackets.

11. The barbecue grill and cart assembly of claim 6 further comprising at least one of a front panel, control panel, gas tank tray, side burner and side tray mounted to said collapsible cart.

12. A collapsible cart for supporting a barbecue grill assembly comprising:
  a generally u-shaped support assembly comprising:
    a generally rectangular frame assembly having first and second ends for mounting thereto at least one of a barbecue grill casting, grill controls, a side burner and a side table;
    a generally rectangular first leg assembly;
    first means for pivotally mounting said first leg assembly to said frame assembly adjacent said first end of said frame assembly for pivoting said first leg assembly between a filly open and fully closed position;
    a generally rectangular second leg assembly;
    second means for pivotally mounting said second leg assembly to said frame assembly adjacent said second end of said frame assembly for pivoting said second leg assembly between a fully open and fully closed position, such that said second leg assembly extends adjacent a bottom side of said frame assembly in said fully closed position and said first leg assembly substantially overlaps said closed second leg assembly in the fully closed position thereby forming a compact design; and
    a pair of wheels mounted to said second leg assembly such that said collapsible cart may be transported in said fully closed position using said wheels.

13. The collapsible cart of claim 12 wherein said first and second means for pivotally mounting said first and second leg assemblies to said frame assembly includes a first pair of brackets extending from said first end of said frame assembly and a second pair of brackets extending from said second end of said frame assembly.

14. The collapsible cart of claim 12 further comprising skid resistant feet mounted to at least one of said first leg assembly and said second leg assembly.

15. The collapsible cart of claim 14 wherein said skid resistant feet are mounted to said first leg assembly and said skid resistant feet are adapted to be used as handles to assist in transporting said collapsible cart in said fully closed position.

* * * * *